United States Patent [19]

Abramson et al.

[11] 4,278,499

[45] Jul. 14, 1981

[54] APPARATUS FOR THE PURIFICATION OF A LIQUID METAL FOR COOLING IN THE CORE OF A FAST NEUTRON REACTOR

[75] Inventors: Roger Abramson; Jean-Paul Delisle, both of Manosque; Xavier Elie, Aix en Provence; Guy Salon, Le Chesnay; Jean-Pierre Peyrelongue, Issy les Moulineaux, all of France

[73] Assignees: Commissariat a l'Energie Atomique; Stein Industrie S.A., both of France

[21] Appl. No.: 916,149

[22] Filed: Jun. 16, 1978

[30] Foreign Application Priority Data

Jun. 22, 1977 [FR] France .................................. 77 19082

[51] Int. Cl.$^3$ ...................... G21C 19/30; G21C 15/24; B01D 27/00
[52] U.S. Cl. .......................................... 176/37; 176/65; 62/55.5
[58] Field of Search ...................... 176/37, 65; 62/55.5, 62/514; 165/119; 174/15 CA; 210/180, 186; 55/52, DIG. 15

[56] References Cited

U.S. PATENT DOCUMENTS

| | | | |
|---|---|---|---|
| 2,248,909 | 7/1941 | Russell | 62/55.5 |
| 3,292,383 | 12/1966 | Charles et al. | 62/55.5 |
| 3,304,731 | 2/1967 | Bills et al. | 62/55.5 |
| 3,552,485 | 1/1971 | Le Jannou | 62/55.5 |
| 3,862,001 | 1/1975 | Marmonier et al. | 176/87 |
| 3,890,233 | 6/1975 | Gischel | 176/37 |
| 4,108,616 | 8/1978 | Hatch | 55/52 |
| 4,124,446 | 11/1978 | de Francisco-Sainz | 176/37 |

*Primary Examiner*—David H. Brown
*Assistant Examiner*—Edward F. Miles

[57] ABSTRACT

Apparatus for the purification of the liquid metal for cooling the core of a fast neutron reactor comprising a heat insulating envelope immersed in the reactor core and suspended from the protective slab surmounting the latter, a removable plug disposed in said slab and giving access to the upper part of the inside of the envelope and, within the latter, a cooling coil for cooling a liquid metal flow taken from the reactor core to a temperature which ensures the solidification of impurities, a filter cartridge for filtering the cooled liquid metal, a heat exchanger for the at least partial heating of the purified metal prior to its return to the reactor core and a valve for regulating the purified metal flow returned to the core, wherein it comprises a passage for returning to the upper part of the envelope purified metal from the filter cartridge, the purified metal being returned to the reactor core with the purified metal in heat exchange with the metal to be purified in a regulated flow, the regulating valve of said flow being disposed in the upper part of the envelope.

7 Claims, 3 Drawing Figures

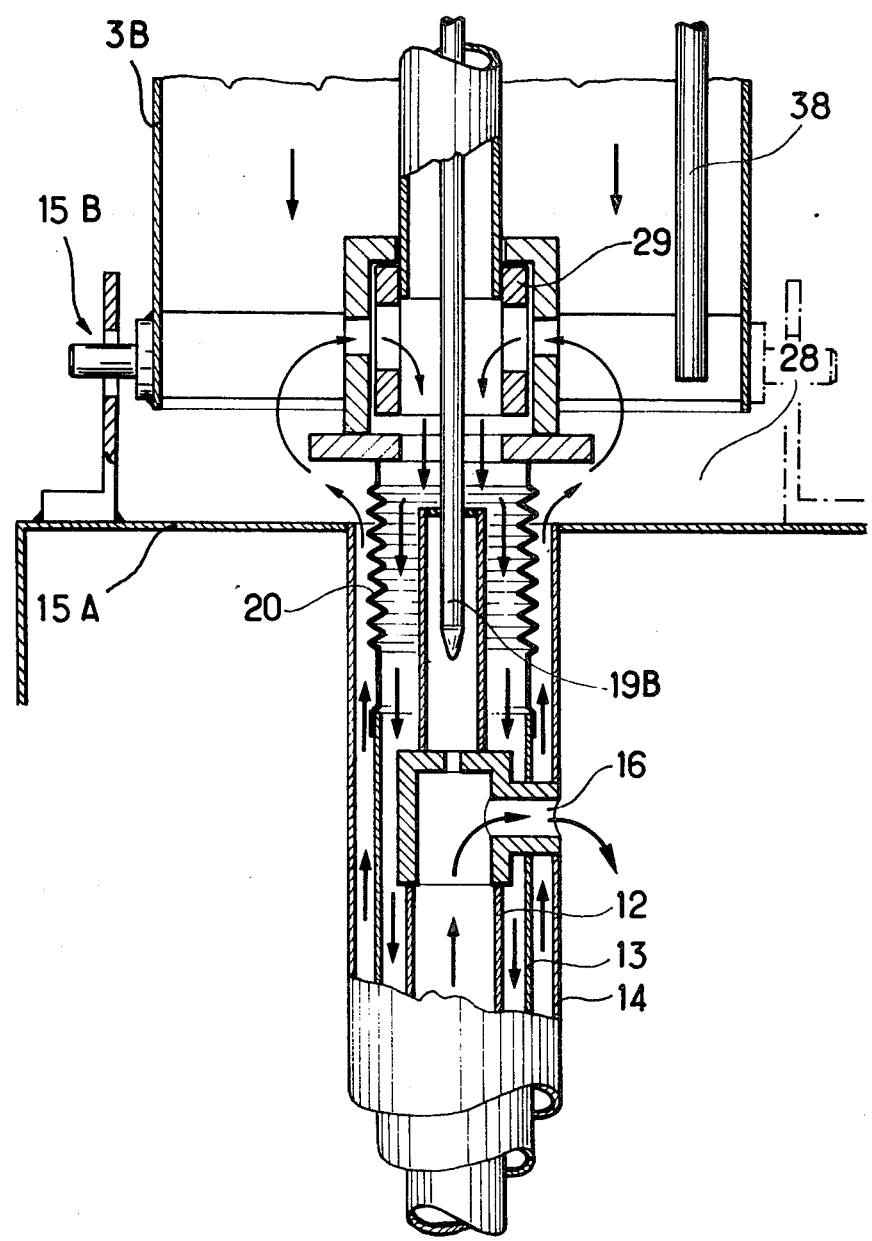

APPARATUS FOR THE PURIFICATION OF A LIQUID METAL FOR COOLING IN THE CORE OF A FAST NEUTRON REACTOR

BACKGROUND OF THE INVENTION

The present invention relates to an apparatus for the purification of the liquid metal for cooling the core of a fast neutron reactor comprising a heat insulating envelope immersed in the reactor core and suspended from the protective slab surmounting the latter, a removable plug disposed in said slab and giving access to the upper part of the inside of the envelope and, within the latter, means for cooling a liquid metal flow taken from the reactor core to a temperature which ensures the solidification of impurities, means for filtering the cooled liquid metal, means for the at least partial heating of the purified metal prior to its return to the reactor core and a valve for regulating the purified metal flow returned to the core.

Known apparatuses of this type have the disadvantage that the purified liquid metal flow regulating valve is located in the lower part and as the liquid metal to be purified, generally an alkaline metal such as sodium, can only be removed from the lower part of the apparatus the purified liquid metal is reheated by indirect heat exchange in countercurrent with the liquid metal to be purified, so that it is necessary to remove the complete purification apparatus from the reactor vessel when said valve has an operating fault. Such a removal constitutes a long and delicate operation, due to the radioactivity of the liquid metal in which the reactor core is submerged.

BRIEF SUMMARY OF THE INVENTION

The problem of the present invention is to obviate the above disadvantage and provide a purification apparatus of the type in which the purified liquid metal flow regulating valve is easily accessible for checking, repairs or possible replacement, without it being necessary to actually remove the purification apparatus from the reactor core and in which due to random malfunctioning of the valve it is only necessary to stop the operation of the apparatus for a very short time, involving reduced precautions relative to the radioactivity of the liquid metal in which the reactor core is submerged.

According to the invention this problem is solved by a purification apparatus wherein it comprises means for returning to the upper part of the envelope purified metal from the filtration means, means for returning to the reactor core of purified metal in heat exchange with the metal to be purified in a regulated flow, the regulating valve of said flow being disposed in the upper part of the envelope.

BRIEF DESCRIPTION OF THE DRAWINGS

A non-limitative embodiment of an apparatus for the purification of the liquid sodium for cooling the core of a fast neutron reactor is described in greater detail with reference to the drawings, wherein show:

FIG. 2 a larger scale view illustrating the purified sodium flow regulating valve.

DETAILED DESCRIPTION OF THE PREFERRED EMBODIMENTS

Figure 1A:
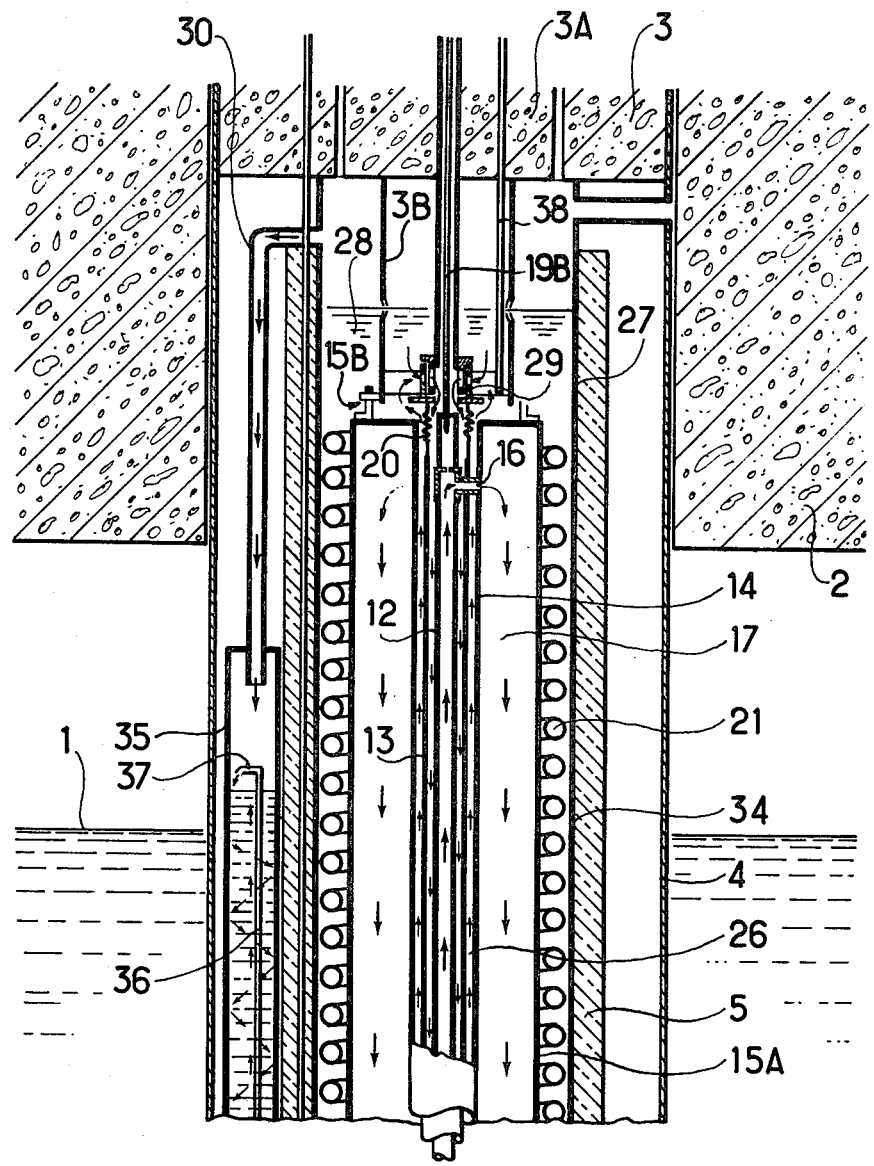
FIGS. 1A and 1B respectively the upper and lower parts of the purification apparatus in axial section.
Figure 1B:
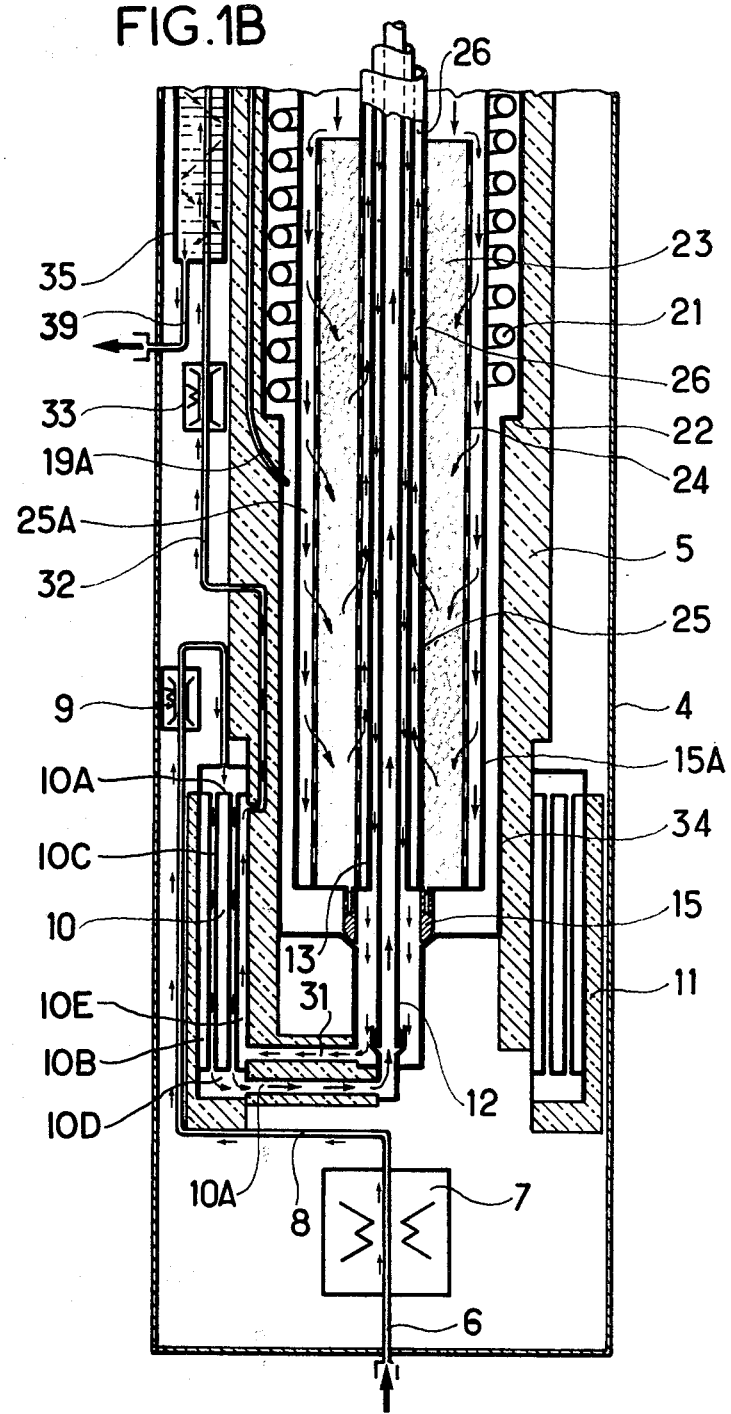

The purification apparatus is placed in a liquid sodium bath 1 surrounding the not shown nuclear reactor core and surmounted by a concrete slab 2. A main annular, removable plug 3 makes it possible to remove, whenever necessary, the purification apparatus which is fixed to said plug through the slab 2. A removable central plug 3A carries the upper part of the apparatus and in particular its purified sodium flow regulating valve 29. By means of a holder 3B fixed beneath the plug 3A and rendered integral with the upper end of the ferrule 15A by a bayonet-type connecting device 15B (FIG. 2) it makes it possible to extract the filter cartridge 23 by removing the ferrule 15A in order to replace the cartridge when it has become choked with deposits of impurities.

The whole apparatus is contained in a cylindrical ferrule 4 within which is disposed a heat insulating sleeve 5, for example an illuminer and silica-based fibrous insulating material.

The base of the purification apparatus is equipped with tubing 6 for sucking in the sodium to be purified which passes through a per se known electromagnetic pump 7, whose electric terminals from the upper level of slab 2 are not shown. Above pump 7 a pipe 8, which is firstly radial and then vertical, rises to an electromagnetic flowmeter 9 and then drops to the upper distribution box of an annular heat exchanger 10 within a heat insulating sheath 11.

Heat exchanger 10 is of the tube bundle type. Its annular arrangement makes it possible to in part position it around the purification cartridge 23 and therefore to reduce the total height of the purification apparatus. It has tubular plates 10A and 10B which distribute the sodium flow to be purified in the tubes 10C, about which the purified sodium to be heated must circulate in countercurrent in a manner to be indicated hereinafter. The impure liquid sodium which cools descends in the tubes, whilst the purified liquid sodium which heats rises around the tubes, so that the circulation of the two liquids in heat exchange relationship takes place in the natural connection direction. The lower collection box 10D for the impure sodium leaving the tube bundle is connected by pipes 10A to axial supply tube 12 for the actual purification apparatus. The inner area 10E of the ferrule of the exchanger, around the tubes, is connected at its lower end by pipes 31 to the annular cold purified sodium return pipe 13 and by a pipe 32 to the electromagnetic flowmeter 33 for measuring the heated purified sodium flow in exchanger 10.

The axial zone of the purification apparatus has three coaxial pipes 12, 13 and 14 serving respectively for the impure sodium supply, the return of purified sodium to exchanger 10 and the ascent to the upper bath of the sodium filtered through the filter cartridge. The walls of these pipes are thin, so that there is an indirect heat exchange between the still relatively hot impure sodium and the cold purified sodium. A spherical bearing surface 15 positioned on the bottom of ferrule 34 supports the inner ferrule 15A containing filter cartridge 23 in a sealed manner, whilst permitting the removal thereof with plug 3A in the manner defined hereinbefore.

In the upper part of the axial pipes radial tubes such as 16 link the inside of the impure sodium supply pipe 12 to the upper part 17 of the inside of ferrule 15A, so as to permit the impure sodium to pass downwards to the filter cartridge. Between ferrules 34 and 15A is provided a cooling coil 21 having two independent outward and return circuits connected to not shown pressurised liquid nitrogen supply sources. This coil drops down to below the upper part of the filter cartridge, level with a shoulder 22 of ferrule 34. Two thermometer probes 19A and 19B respectively provide details on the final cooling temperature of the sodium and its temperature on entering zone 17.

The upper zone 17 of the inside of the inner ferrule 15A is empty so as to permit the impure sodium to cool in heat exchange with the cold nitrogen coil before reaching the filter cartridge 23. The latter comprises superimposed pads of stainless steel wire gauze disposed between an outer perforated metal sheet 24 and an inner perforated metal sheet 25. An annular space 25A is left between outer sheet 24 and ferrule 15A, so that the impure sodium only progressively passes through the filter pads to the inner annular zone 26 linked with the upper vessel 27 containing the purified sodium bath 28. The bottom of said vessel is connected at its periphery to the annular zone containing coil 21, which is therefore submerged in the cooled purified liquid sodium.

The plug valve 29 located in the bottom of vessel 27 links the purified sodium bath 28 and the annular pipe 13 for returning the purified sodium to exchanger 10. It is connected to pipe 13 by a metal bellows 20 which serves to maintain the sealing of the return circuit in the case of differential displacements or expansions between plug 3 and cartridge 23. The valve is provided with rotation means controlled through plug 3A and movable openings facing fixed openings. This rotation permits a regulation of the purified sodium flow passed to the exchanger 10 as a function of the temperature of the impure sodium in which the reactor core is immersed and the temperature difference between probes 19B and 19A.

A level measuring sensor 38 makes it possible to control at all times the level of the purified sodium in bath 28, together with its possible outflow through overflow 30.

When it is desired to reduce the flow of purified sodium returning through exchanger 10 valve 29 is partly closed in such a way that the sodium level in vessel 27 rises and reaches the overflow 30. The latter makes it possible to discharge externally of the cooling apparatus and without prior heating part of the purified cold sodium. It issues into the degassing pot 35 which is also supplied by a tube 36 for raising the heated purified sodium into exchanger 10 at a flow rate measured by flowmeter 33.

In degassing pot 35 a whirling movement is imparted to the purified sodium, for example by tangential introduction by means of crosshead 37 of sodium coming from exchange 10 by means of tube 36, in such a way that the gases dissolved in the sodium escape upwards. The bottom of pot 35 is connected to the reactor vessel by tube 39 for returning the purified and degassed sodium.

The purification apparatus functions as follows:

Electromagnetic pump 7 draws in the sodium to be purified and whose temperature may vary between 550° and 180° C. by means of pipe 6. The impure sodium is supplied by pipe 8 to flowmeter 9 and annular exchanger 10 where it is cooled in countercurrent with the purified sodium to a temperature equal to or slightly above 140° C. It then passes through radial pipes 10A and axial pipe 12 to radial pipes 16 where it flows out into ferrule 15A containing filter cartridge 23. It passes downwards, whilst cooling in indirect heat exchange with the pressurised nitrogen of the double coil 21 up to a temperature equal to or very slightly above 110° C., in such a way that its impurities and particularly sodium oxide crystallise. The final temperature of the impure sodium is adjusted by varying the flow of cooling nitrogen.

The sodium containing the crystallised impurities then passes through the filter cartridge 23 where it loses its impurities. It then rises through the annular zone 26 to the upper vessel 27 where part of the sodium passes through plug valve 29 into the axial annular downwardly directed pipe 13. From pipe 13 the sodium passes through radial pipes 31 into exchanger 10, where it is heated in indirect exchange with the impure sodium and then passes through pipe 32, flowmeter 33 and vertical pipe 36 into degassing pot 35.

When the temperature of the sodium to be purified is relatively low only part of the purified sodium is passed into exchanger 10. Plug valve 29 is then partly closed in such a way that the level of the sodium bath 28 in vessel 27 reaches that of overflow 30. Part of the purified sodium then flows out directly through the overflow into the degassing pot 35 and from there into the reactor vessel.

When filter cartridge 23 has become choked with deposits of impurities it may be replaced by simultaneously removing plug 3A and the replaceable assembly constituted by ferrule 15A and the members contained within the latter and in particular filter cartridge 23. It is then possible to fit a further replaceable assembly containing in particular a new filter cartridge.

Although the apparatus described in detail hereinbefore with reference to the drawings would appear to be preferable, it is readily apparent that various modifications can be made thereto without passing beyond the scope of the invention and certain of its components may be replaced by others which fulfil the same technical function. In particular other materials could be used for the filter cartridge. The structure of the final cooling device for the sodium need not be a double coil. The purified sodium flow regulating valve returned in heat exchange with the impure sodium need not be a plug valve.

What is claimed is:

1. An apparatus for the purification of coolant liquid metal in a fast neutron nuclear reactor of the type comprising a vessel, a core and coolant liquid metal contained in the vessel, and an upper protective slab closing said vessel, said protective slab having a first removable plug and a second removable plug provided within said first plug, said apparatus comprising:

a vertical elongate insulating envelope suspended from said first plug at an upper end thereof, said envelope being located within said vessel and having inlet means for introducing said liquid metal into said envelope from said vessel, outlet means for re-introducing purified liquid metal into said vessel, cooling means for cooling said liquid metal introduced into said envelope to a temperature which ensures the solidification of impurities, filtering means for purifying said liquid metal cooled by said cooling means, means for directing the purified liquid metal from the filtering means towards said upper end of said envelope, valve means suspended from said second plug and located in said upper end of said envelope for regulating the purified liquid metal flow prior to its re-introduction to said vessel through said outlet means, heat exchange means for at least partial heating of the purified liquid metal prior to its re-introduction to the vessel through said outlet means, and means for directing the flow of liquid metal to be purified from said inlet means through said heat exchange means, there being provided a triple envelope axial tube, the inner zone of said tube being connected with said heat exchange means for circulating the liquid metal to be purified in an upwards direction after it is partly cooled in said heat exchange means, the intermediate zone of said tube being connected with said valve means for circulating the purified liquid metal coming from said valve means in a downwards direction, and the outer zone of said tube being in communication with said filtering means for circulating the purified liquid metal coming from said filtering means in the upwards direction.

2. Apparatus according to claim 1, wherein said heat exchange means cools said liquid metal to be purified to a first temperature range by means of heat exchange with at least part of the purified liquid metal being directed for re-introduction to said vessel, the circulations of said liquid metal to be purified and the purified liquid metal corresponding to their natural convection direction.

3. Apparatus according to claim 1, wherein the upper end of said envelope forms a vessel for receiving the purified liquid metal from said filtering means, said valve means being disposed in the lower part of said vessel formed by the upper end of said envelope and being integral with said second plug.

4. Apparatus according to claim 3, wherein said cooling means comprises second heat exchange means having a cold fluid circulating therein and disposed between a heat insulating sleeve and a passage in which the liquid metal to be purified is directed towards said filtering means, the second heat exchange means being contained in an annular zone connected to the bottom of said vessel for receiving the purified liquid metal from said filtering means.

5. Apparatus according to claim 1, wherein there is provided a degassing pot wherein a whirling movement is imparted to the purified liquid metal prior to its re-introduction to said vessel through said outlet means.

6. Apparatus according to claim 5, wherein said degassing pot is provided with means for the introduction of the purified liquid metal, said means for the introduction of the purified metal being connected to said heat exchange means.

7. Apparatus according to claim 1, wherein there is provided at least one overflow in the vicinity of said valve means.

* * * * *